United States Patent
Hatta

(10) Patent No.: US 8,906,287 B2
(45) Date of Patent: Dec. 9, 2014

(54) GAS TANK AND METHOD OF MANUFACTURING LINER FOR GAS TANK

(75) Inventor: Ken Hatta, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 970 days.

(21) Appl. No.: 12/565,373

(22) Filed: Sep. 23, 2009

(65) Prior Publication Data

US 2010/0072209 A1    Mar. 25, 2010

(30) Foreign Application Priority Data

Sep. 24, 2008   (JP) ................................. 2008-244131

(51) Int. Cl.
- B29C 45/56 (2006.01)
- F17C 1/16 (2006.01)

(52) U.S. Cl.
CPC ............. *F17C 1/16* (2013.01); *F17C 2221/033* (2013.01); *F17C 2205/0397* (2013.01); *F17C 2203/067* (2013.01); *F17C 2270/0184* (2013.01); *F17C 2201/056* (2013.01); *F17C 2201/0109* (2013.01); *F17C 2205/0305* (2013.01); *F17C 2203/0646* (2013.01); *F17C 2203/0636* (2013.01); *F17C 2203/0648* (2013.01); *F17C 2221/012* (2013.01); *F17C 2223/0123* (2013.01); *F17C 2209/23* (2013.01); *F17C 2209/2136* (2013.01); *F17C 2223/036* (2013.01); *F17C 2203/0621* (2013.01); *F17C 2260/011* (2013.01); *F17C 2265/031* (2013.01); *F17C 2203/0604* (2013.01); *Y02E 60/321* (2013.01); *F17C 2203/0619* (2013.01)
USPC ......................... 264/544; 264/328.7; 264/154

(58) Field of Classification Search
None
See application file for complete search history.

(56) References Cited

U.S. PATENT DOCUMENTS

| | | | | |
|---|---|---|---|---|
| 3,648,886 | A | * | 3/1972 | Pringle .......................... 220/723 |
| 5,656,234 | A | * | 8/1997 | Kaneishi et al. ............... 264/572 |
| 6,227,402 | B1 | * | 5/2001 | Shimojima et al. ........... 220/581 |

FOREIGN PATENT DOCUMENTS

| | | |
|---|---|---|
| JP | 63-128381 U | 8/1988 |
| JP | 04-357009 A | 12/1992 |
| JP | 07-305798 A | 11/1995 |
| JP | 11-210988 A | 8/1999 |
| JP | 2004-176885 A | 6/2004 |
| JP | 2008-190699 A | 8/2008 |

* cited by examiner

*Primary Examiner* — Monica Huson
(74) *Attorney, Agent, or Firm* — Kenyon & Kenyon LLP

(57) ABSTRACT

A gas tank, includes: a liner; and a fiber reinforced plastic layer. A hollow portion is formed within a thickness of the liner along an axial direction of the tank.

3 Claims, 10 Drawing Sheets

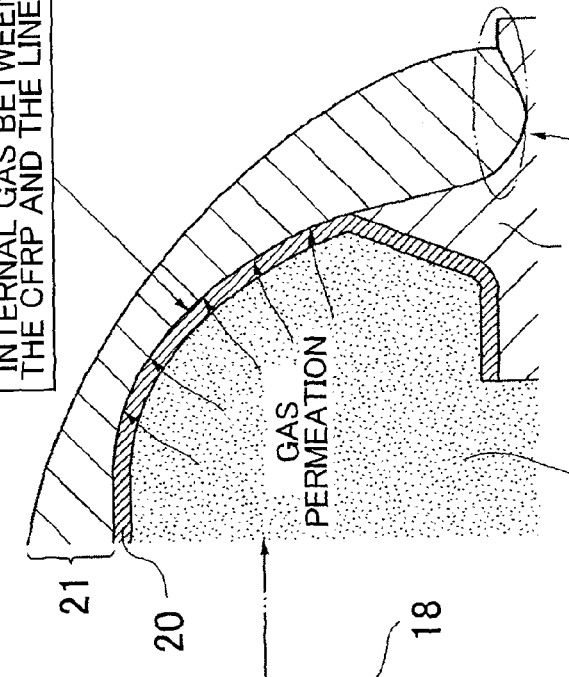
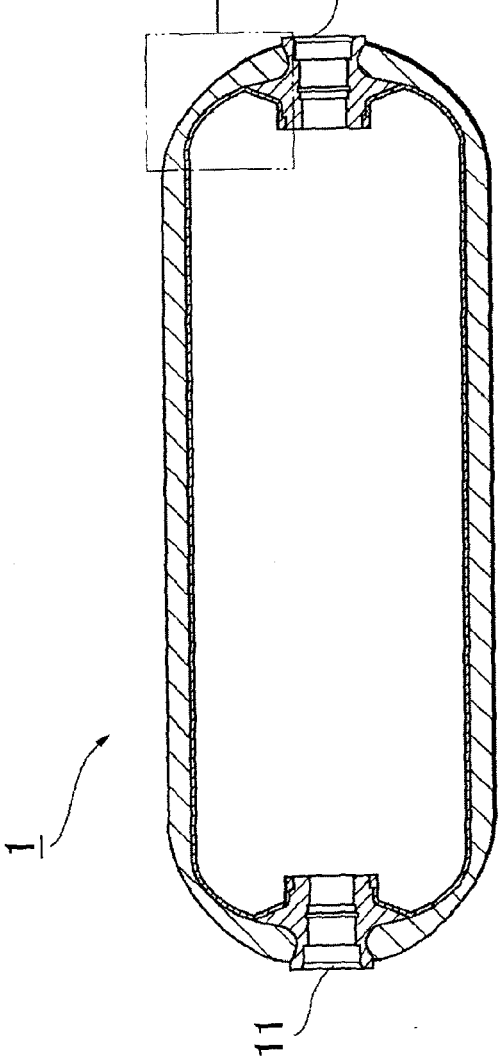

F I G . 1 1
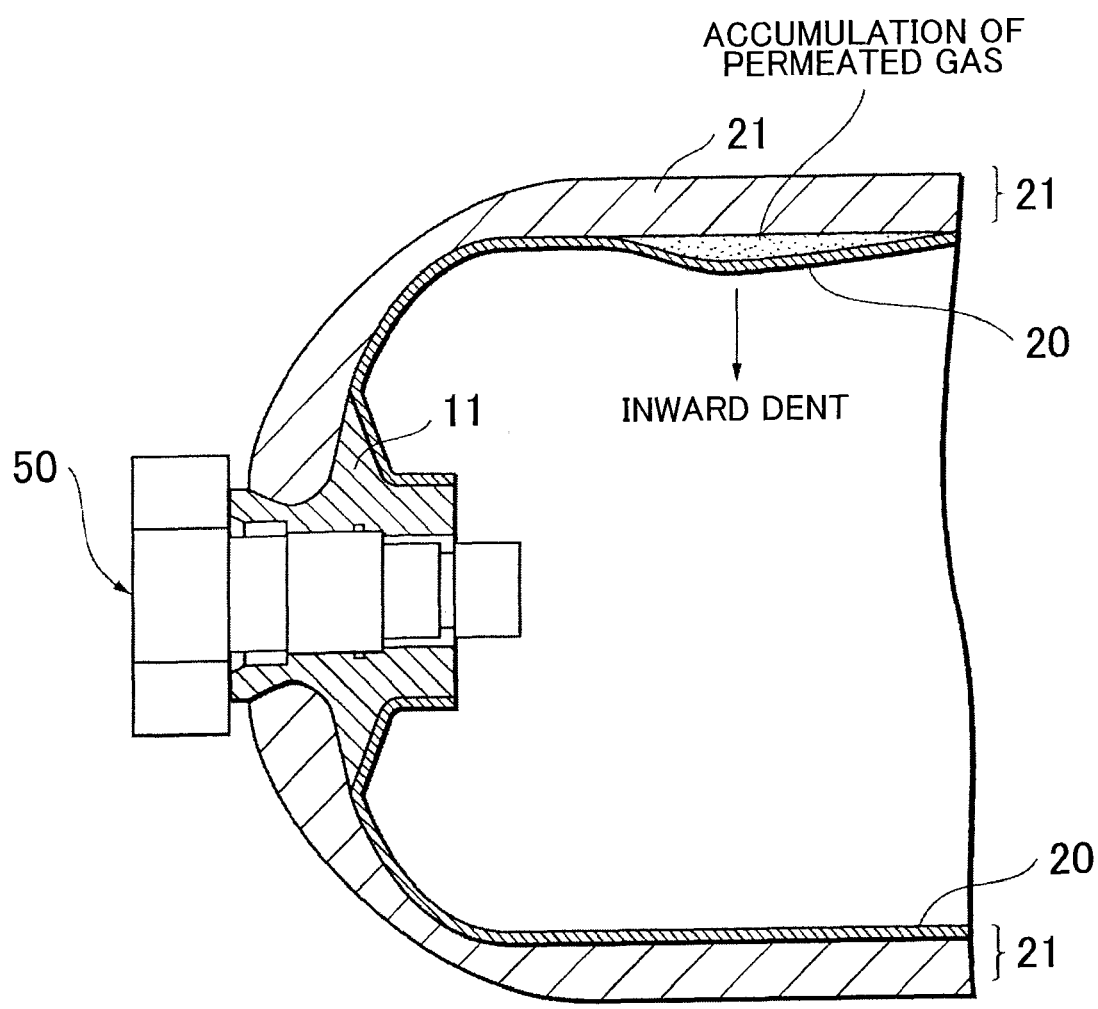

GAS TANK AND METHOD OF MANUFACTURING LINER FOR GAS TANK

INCORPORATION BY REFERENCE

The disclosure of Japanese Patent Application No. 2008-244131 filed on Sep. 24, 2008 including the specification, drawings and abstract is incorporated herein by reference in its entirety.

BACKGROUND OF THE INVENTION

1. Field of the Invention

The present invention relates to a gas tank and a method of manufacturing a gas tank liner. More specifically, the present invention relates to an improvement in the structure of a gas tank and a method of manufacturing a suitable liner for the gas tank with the improved structure.

2. Description of the Related Art

A gas tank (high-pressure gas storage container) used for storing or supplying hydrogen and the like is known that includes: a tank body that has a liner in which the outer peripheral surface is impregnated with resin and reinforced with a carbon fiber reinforced plastics (CFRP) layer, for example; and a cap that is made of alloy and attached to the opening of the tank body. For example, a valve assembly (a part that includes a high-pressure valve and the like) may be attached to the cap that is provided in a tank opening.

A gas tank (e.g., a hydrogen storage container) that includes an inner layer and an outer layer is also disclosed in which a gas-venting flow passage that leads to outside the tank is formed between the inner layer and the outer layer (see Japanese Patent Application Publication No. 2004-176885 (JP-A-2004-176885), for example).

However, if the gas-venting flow passage is formed between a contacting surfaces of the two layers (the inner layer and the outer layer) as in the above gas tank, strength of the tank may be compromised.

In order to solve such a problem, the inventors has made various deliberations. In such high-pressure tanks, the problem may be attributed to the two-layer structure that is formed from a liner layer as the inner layer and a fiber reinforced plastics (FRP) layer as the outer layer, as trace amounts of hydrogen gas may permeate through the liner layer when the tank remains under a pressurized state. In this case, because a space between the FRP layer and the cap is pressure-sealed in the highly pressurized tank, hydrogen gas accumulates between the liner layer and the FRP layer, thereby causing inward deformation of the liner layer (see FIG. 11). When the inner pressure of the tank decreases as hydrogen gas is consumed, hydrogen gas that has high concentration leaks from the tank through the weakly sealed space between the FRP layer and the cap (see FIG. 12). After the deliberation on high-pressure tanks, particularly on the phenomenon that hydrogen gas permeates through the liner layer, the inventor has reached a new finding that links to a solution for the problem.

SUMMARY OF THE INVENTION

The present invention provides a gas tank whose strength is not degraded by the formation of a gas-venting flow passage, and a method of manufacturing a liner for the gas tank.

A first aspect of the present invention relates to a gas tank that includes a liner and a fiber reinforced plastics (FRP) layer. A hollow portion is formed within a thickness of the liner along the axial direction of the tank.

According to the above aspect, gas (e.g., hydrogen gas) that has permeated through the liner may be caught in the hollow portion provided in the liner, and can be discharged from the tank. Accordingly, it is possible to prevent accumulation of the gas between the liner and the FRP layer. In addition, because the hollow portion to discharge the permeated gas is formed within the liner plate, the strength of the liner itself is not greatly degraded.

A second aspect of the present invention relates to a method of manufacturing a liner for a gas tank that includes the liner and a fiber reinforced plastics (FRP) layer. The method of manufacturing the liner includes: injecting resin from an injection gate into a cavity formed between a main platen and a core of a mold; injecting pressurized inert gas through the gate during injection of the resin; enlarging the cavity by pulling back a part of the core; and cooling down and hardening the resin while gas pressure is maintained for a specified period of time, and then discharging the pressurized gas to collect the liner.

According to the above aspect, a hollow portion that follows the axial direction of the tank can be provided within the liner plate by so-called gas injection molding. The hollow portion can catch the gas (e.g., hydrogen gas) that has permeated through the liner and discharge the gas to the outside of the tank. Accordingly, it is possible in the high-pressure tank to prevent accumulation of the gas, which has permeated through the liner, between the liner and the FRP layer. In addition, because the hollow portion to discharge the permeated gas is formed within the liner plate, the strength of the liner itself is not greatly degraded.

According to the above aspects, it is possible to prevent degradation of the tank strength even when the gas-venting fluid passage is formed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 10A is a general view of the high-pressure tank;

FIG. 10B is a partially enlarged view that shows the accumulation of hydrogen gas that has penetrated through the resin liner between the resin liner and an outer reinforced layer (CFRP layer) for reference;

FIG. 11 shows a state where the resin liner is deformed inwardly when hydrogen gas is discharged for reference.

DETAILED DESCRIPTION OF EMBODIMENT

Figure 1:
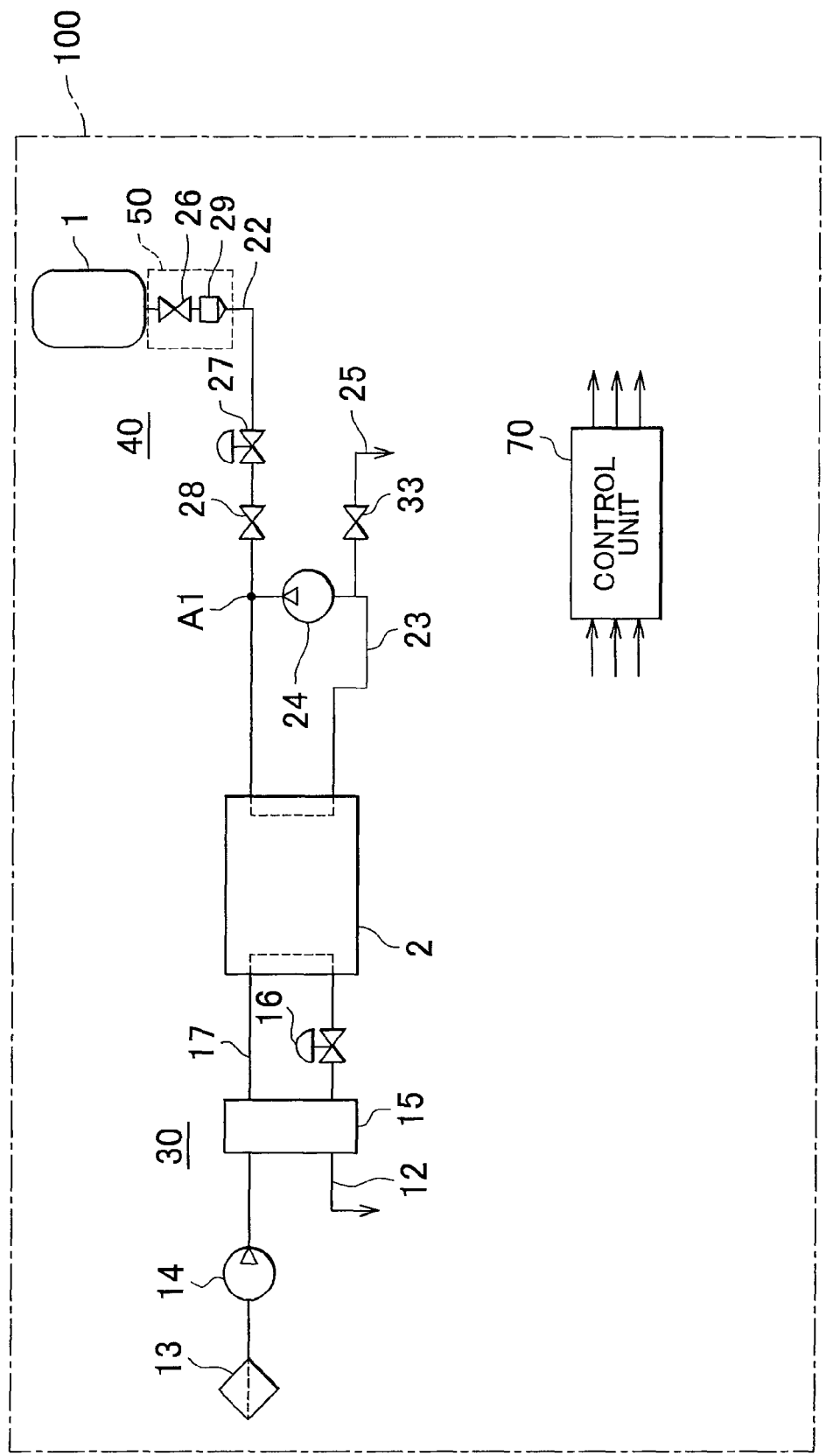
FIG. 1 shows a configuration example of a fuel cell system according to an embodiment of the present invention.

The construction of the present invention will hereinafter be described in detail on the basis of an embodiment shown in the drawings. FIG. 1 to FIG. 9 show a gas tank and a manufacturing method thereof according to the embodiment of the present invention. A gas tank 1 (hereinafter referred to as a high-pressure tank in some instances) includes a cap 11, a resin liner (liner) 20, and a carbon fiber reinforced plastics (CFRP) layer (reinforced layer) 21 that is provided on the outer periphery of the resin liner 20. A description will hereinafter be made in a case where the high-pressure tank 1 according to the embodiment is applied to a high-pressure hydrogen tank as a fuel supply source in a fuel cell system 100.

The general construction of the fuel cell system in this embodiment (see FIG. 1) will be described first. The fuel cell system 100 includes: a fuel cell 2; an oxidation gas piping system 30 that supplies air (oxygen) to the fuel cell 2; a fuel-gas piping system 40 that supplies hydrogen gas to the fuel cell 2; and a control unit 70 that controls the overall system.

The fuel cell 2 is constructed from a solid polyelectrolyte and has a stack structure in which a number of unit cells are laminated. The unit cells of the fuel cell 2 each have an air cathode on one surface of an electrolyte that is formed from an ion-exchange membrane, a fuel anode on the other surface of the electrolyte, and a pair of separators that sandwiches the air cathode and the fuel anode. The fuel gas is supplied into a fuel gas flow passage in one of the separators while oxidation gas is supplied into an oxidation gas flow passage in the other of the separators. The fuel cell 2 produces electricity from the supplied gases.

The oxidation gas piping system 30 has: a supply passage 17 through which oxidation gas to be supplied to the fuel cell 2 flows; and a discharge passage 12 through which oxidation off-gas that is discharged from the fuel cell 2 flows. The supply passage 17 is provided with a compressor 14 that receives oxidation gas through a filter 13, and a humidifier 15 that humidifies oxidation gas forcedly fed by the compressor 14. Oxidation gas, which flows through the discharge passage 12, passes through a back-pressure regulation valve 16 and is subjected to moisture exchange in the humidifier 15 before being discharged as exhaust gas to the atmosphere outside of the system.

The fuel gas piping system 40 has: the high-pressure tank 1 as a fuel supply source that is filled with high-pressure hydrogen; a supply passage 22 through which hydrogen gas to be supplied to the fuel cell 2 flows from the high-pressure tank 1; a circulation passage 23 for returning hydrogen-off gas (fuel-off gas) that is discharged from the fuel cell 2 to a confluence A1; a pump 24 that forcedly feeds hydrogen-off gas in the circulation passage 23 to the supply passage 22; and a discharge passage 25 that is branch-connected to the circulation passage 23.

The high-pressure tank 1 is preferred as a fuel gas supply tank for a fuel cell vehicle. Although not shown, three high-pressure tanks 1 are installed in the rear section of the vehicle, for example. The high-pressure tank 1 constitutes a part of the fuel cell system 100 and supplies fuel gas to the fuel cell 2 through the fuel gas piping system 40. The fuel gas that is stored in the high-pressure tank 1 may be high-pressure combustible gas such as hydrogen gas and compressed natural gas.

The high-pressure tank 1 in this embodiment is constructed such that hydrogen gas may be stored therein at pressure such as 35 MPa. When a main stop valve 26 of the high-pressure tank 1 is open, hydrogen gas flows into the supply passage 22. After the flow rate and pressure of hydrogen gas is adjusted by an injector 29, the pressure of hydrogen gas is eventually reduced to approximately 200 kPa, for example, by mechanical a pressure regulating valve 27 or other pressure reducing valve downstream from the injector 29. Then, hydrogen gas is supplied to the fuel cell 2. The main stop valve 26 and the injector 29 are embedded in a valve assembly 50 that is shown in a broken line box in FIG. 1. The valve assembly 50 is connected to the high-pressure tank 1.

A shutoff valve 28 is provided upstream of the supply passage 22 from the confluence A1. A circulation system of hydrogen gas is constructed by communicating a flow passage downstream of the confluence A1 in the supply passage 22, the fuel gas flow passage formed in one of the separators of the fuel cell 2, and the circulation passage 23 in the respective order. A purge valve 33 on the exhaust passage 25 is appropriately opened during the operation of the fuel cell system 100 so that impurities in hydrogen off-gas are discharged along with hydrogen off-gas into a hydrogen diluter (not shown). When the purge valve 33 is open, concentration of the impurities in hydrogen off-gas is reduced, and concentration of hydrogen in hydrogen off-gas, which is circulated for supply, is increased in the circulation passage 23.

The control unit 70 is constructed as a microcomputer that includes a CPU, a ROM, and a RAM. The CPU executes a desired calculation in accordance with a control program (programme) and performs various processing and controls such as flow rate control of the injector 29. The ROM stores the control program and control data processed by the CPU. The RAM is mainly used as various workspace for control processing. The control unit 70 receives various detection signals from a pressure sensor, a temperature sensor, and the like that are used in the gas systems (30 and 40) and a refrigerant system (not shown) and transmits the signals to each component.

Next, the structure of the high-pressure tank 1 will be described.

Figure 2:
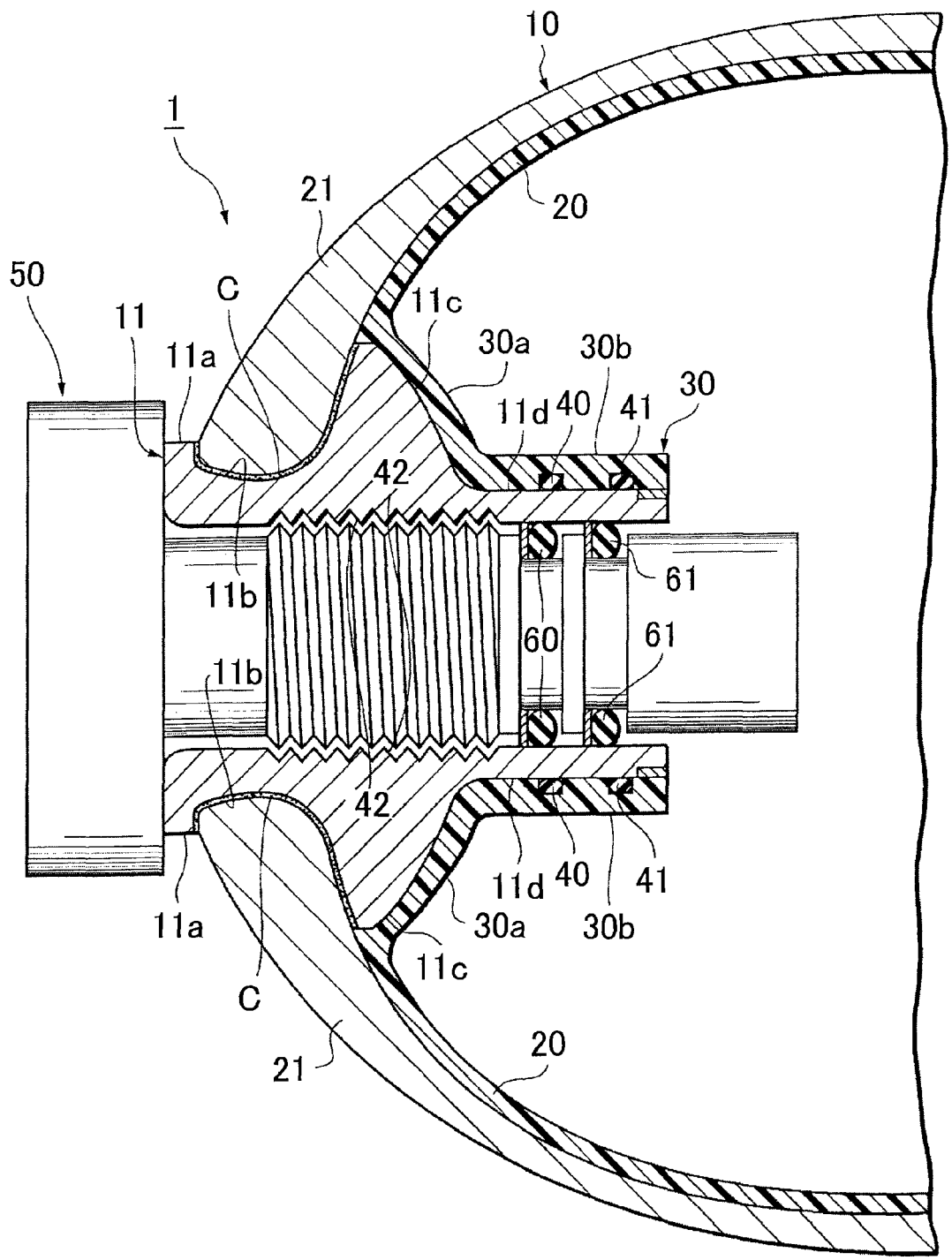
FIG. 2 is a cross sectional view that shows main components of a high-pressure tank according to the embodiment of the present invention.

FIG. 2 is a sectional view that shows the main components of the high-pressure tank 1. The high-pressure tank 1 has a cylindrical tank body 10 with hemispherical ends, for example, and the cap 11 that is attached to one axial end of the tank body 10.

The tank body 10 has a two-layer wall structure, where the liner 20 is the inner wall layer and a resin filament layer (reinforced layer), such as the CFRP layer 21, is the outer wall layer.

The liner 20 is formed in the approximately same shape as the tank body 10. The liner 20 is formed from polyethylene resin, polypropylene resin, or other hard resin, for example (hereinafter, the liner 20 will also be referred to as the resin liner 20).

A tip side of the resin liner 20 with the cap 11 is formed with a folded portion 30 that is folded inwardly. The folded portion 30 is folded toward the inside of the tank body 10 so as to separate from the outer CFRP layer 21. The folded portion 30 has: a radius reduction portion 30a that gradually decreases in radius as it approaches the tip of the folded portion 30; and a cylindrical portion 30b that has a constant radius and is connected to a tip of the radius reduction portion 30a. An opening of the resin liner 20 is formed by this cylindrical portion 30b.

The cap 11 is generally cylindrical and fitted in the opening of the resin liner 20. For example, the cap 11 is made of aluminum (aluminium) or aluminum (aluminium) alloy and formed in a specified shape by a die casting method or the like. The cap 11 is attached to the resin liner 20 by insert molding, for example.

The cap 11 is formed with a flange 11a in the outer end (the outer side of the high-pressure tank 1 in the axial direction) and an annular recess 11b with respect to the axis of the high-pressure tank 1 behind the flange 11a (the inner side of the high-pressure tank 1 in the axial direction), for example. The recess 11b is curved, and projected to the axial side. A portion close to the tip of the CFRP layer 21, which is also rounded, contacts with this recess 11b in an airtight manner.

A solid lubricant coating "C" such as, for example, a fluorinated resin, may be applied to the surface of the recess 11b. Consequently, the friction coefficient between the CFRP layer 21 and the recess 11b is reduced.

The further rear side of the recess 11b of the cap 11 (the inner side of the high-pressure tank 1 in the axial direction) is formed to fit into the shape of the folded portion 30 of the resin liner 20, for example. For example, a projection 11c that is continuous with the recess 11b is formed in a large diameter, and a cap cylindrical portion 11d with a constant diameter is formed in the rear side of the projection 11c. The radius reduction portion 30a in the folded portion 30 of the resin liner 20 tightly contacts with the surface of the projection 11c, and the cylindrical portion 30b tightly contacts with the surface of the cap cylindrical portion 11d. Sealing members 40 and 41 are interposed between the cylindrical portion 30b and the cap cylindrical portion 11d.

The inner peripheral surface of the cap 11 is formed with a thread 42 on which the valve assembly 50 is screwed to. The valve assembly 50 controls supply and discharge of the fuel gas between an external gas supply line (the supply passage 22) and the inside of high-pressure tank 1. Sealing members 60 and 61 are interposed between the outer peripheral surface of the valve assembly 50 and the inner peripheral surface of the cap 11.

The CFRP layer 21 is formed by Filament Winding molding (FW molding), for example, such that a reinforced fiber sheet that is impregnated with resin is wound over the outer peripheral surface of the resin liner 20 and the recess 11b of the cap 11 and that the resin is hardened thereafter. Examples of the resin used for the CFRP layer 21 include epoxy resin, modified epoxy resin, and unsaturated polyester resin, for example. As the reinforced fiber, carbon fiber, metal fiber, or the like may be used.

Figure 5:
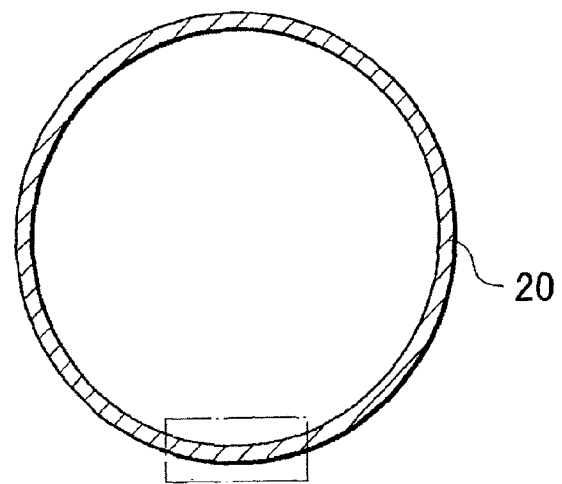
FIG. 5 is a cross sectional view of the whole circumference of the resin liner taken along the line V-V in FIG. 4.
Figure 6:
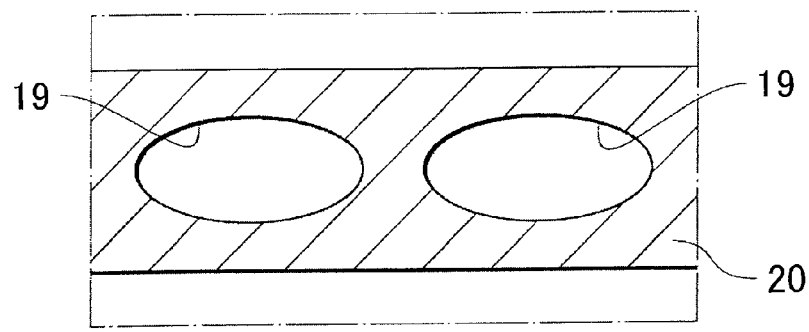
FIG. 6 is an enlarged view of a framed portion in FIG. 5.

Within the thickness of the resin liner 20 that constitutes the high-pressure tank 1 of this embodiment, a plurality of hollow portions (hollow slots) 19 that extend in the axial direction of the high-pressure tank 1 are formed by gas injection and the like (see FIG. 5 and FIG. 6). Because the plural hollow portions 19 are formed within the plate of the resin liner 20, both side surfaces of the resin liner 20 are generally flat. Each of these hollow portions 19 is formed to have a gas discharge port near the cap 11 by communicating an end of each hollow portion 19 with the opening of a gate cutoff portion, which will be described later, for example. These hollow portions 19 are also formed generally in parallel with each other in the axial direction of the high-pressure tank 1.

In the high-pressure tank 1 constructed as described above, a portion or majority of hydrogen gas that has permeated through the resin liner 20 is caught in the hollow portion 19 described above and discharged outside of the tank without accumulating between the resin liner 20 and the CFRP layer 21. Accordingly, each hollow portion 19 functions as a leak port that catches and discharges hydrogen that has permeated the resin liner 20 to the outside of the tank. In addition, the inclusion of the hollow portions 19 reduces the weight of the resin liner 20. Furthermore, the strength of the resin liner 20 per unit weight is increased with the hollow portions 19, which may increase the strength itself of the resin liner 20 in comparison with a solid resin liner, that does not have the hollow portions 19.

To realize an efficient catch and discharge of hydrogen gas that has permeated through the resin liner 20, at as many locations as possible, these hollow portions 19 may be formed continuously along the entire length of the resin liner 20. In addition, many of the hollow portions 19 may be formed in a region where the required strength of the resin liner 20 is secured or may be formed at equally spaced intervals in the circumferential direction of the resin liner 20.

Figure 3:
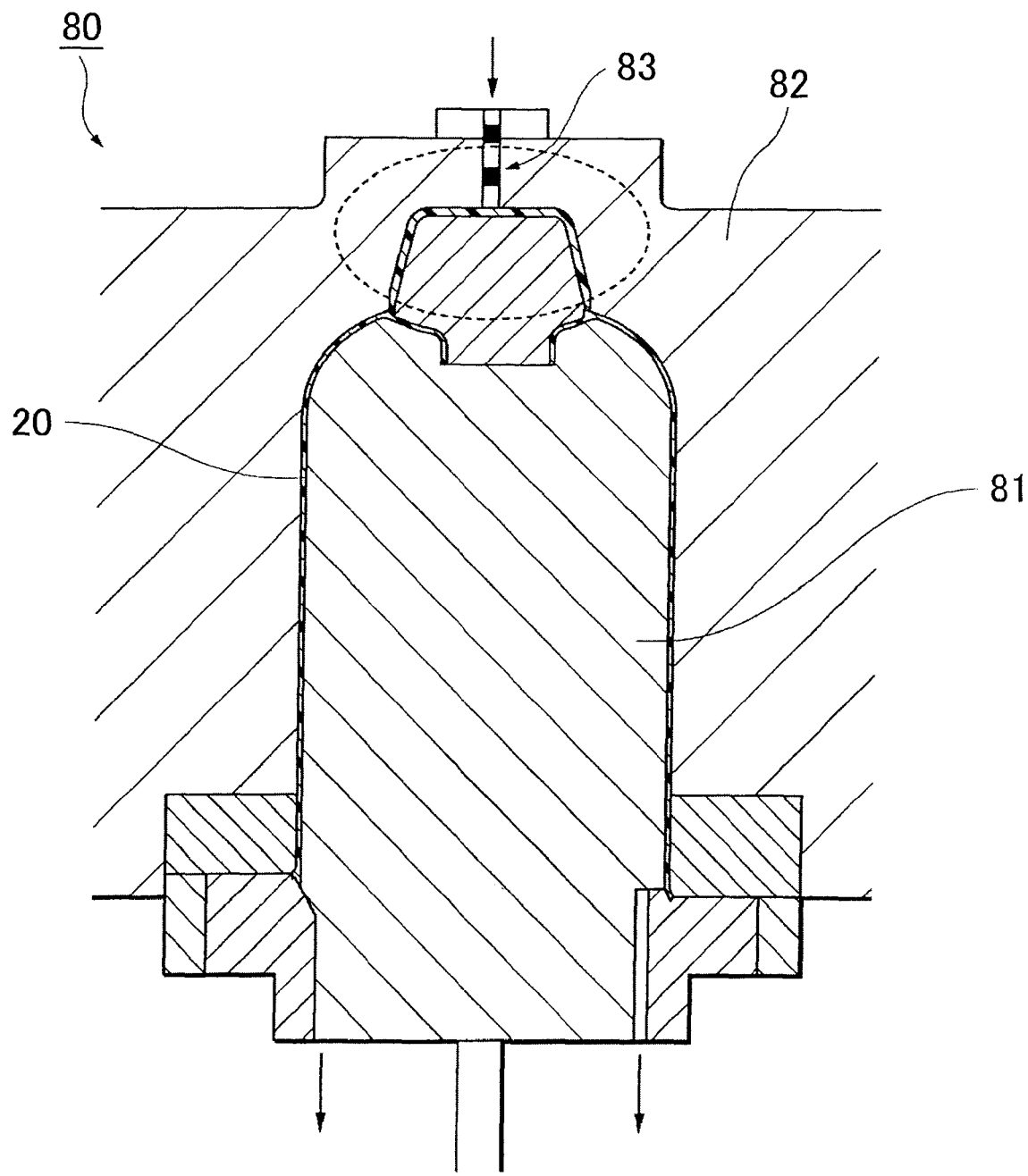
FIG. 3 is a schematic view of a mold that shows an embodiment of a method of manufacturing the high-pressure tank.
Figure 4:
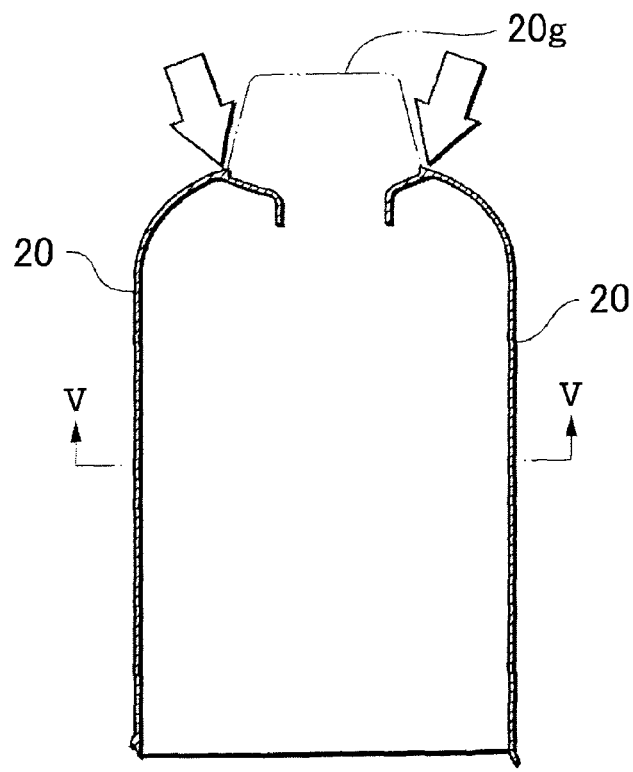
FIG. 4 only shows a vertical cross section of a resin liner, which is an example of a molded product of the resin liner.
Figure 9:
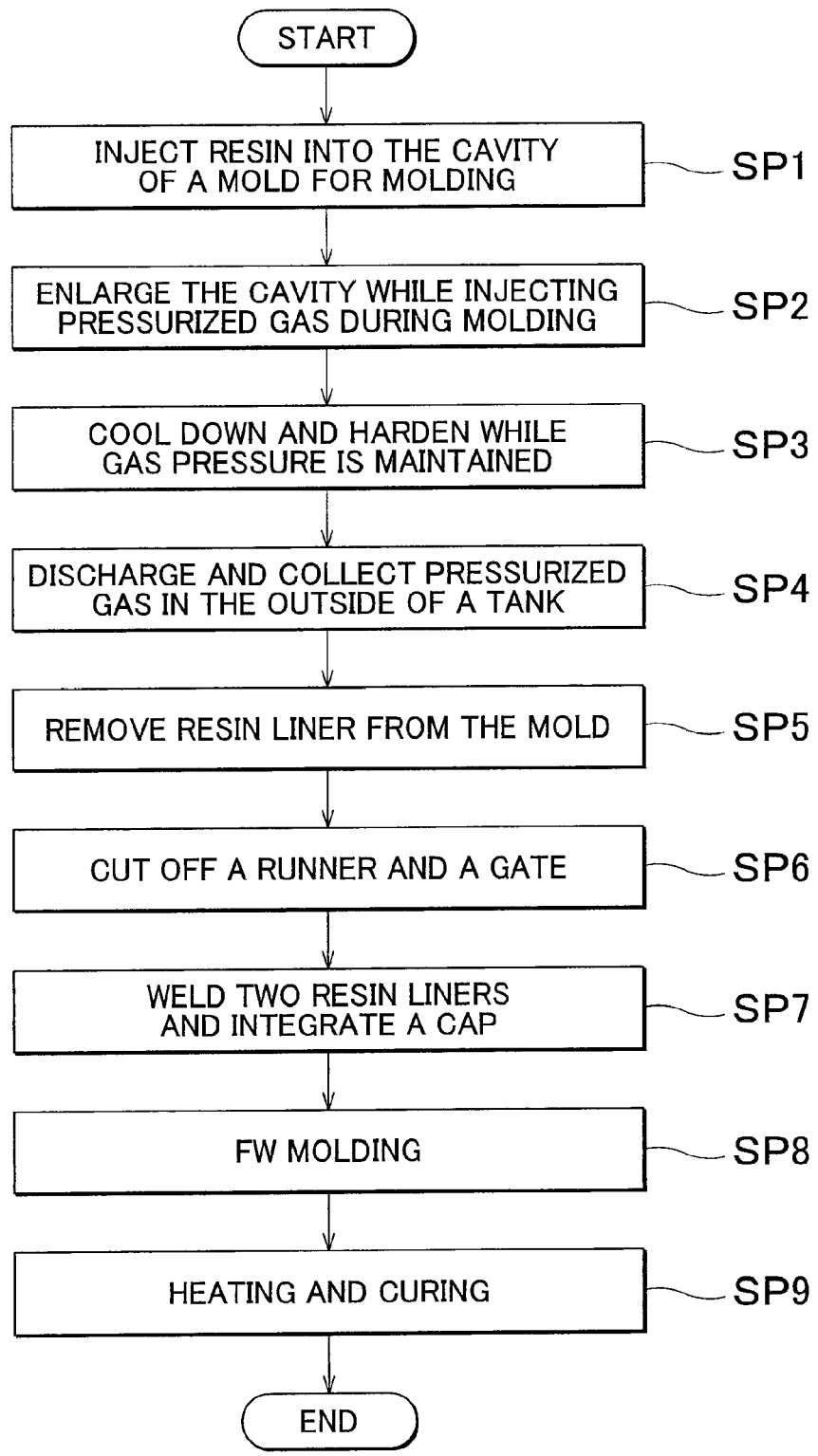
FIG. 9 is a flowchart that illustrates an example of the method of manufacturing the high-pressure tank.

Next, a method of manufacturing such a high-pressure tank 1 will be described (see FIG. 3 and FIG. 9).

First, resin is injected from an injection gate 83 into a cavity that is formed between a core (male mold) 81 and a main platen (female mold) 82 of a mold 80 for injection molding (step SP1). During molding of the resin liner 20, the core 81 is pulled back to gradually widen the cavity while pressurized gas such as inert gas is injected through the gate 83 (step SP2), and the gas pressure is maintained for a specified time period as the resin liner 20 cools and hardens (step SP3). Then, the pressurized gas is discharged outside of the tank and collected (step SP4). The pressurized gas may be discharged from the lower side of the mold 80 (the opposite side from the gate 83), for example. In FIG. 3, a molding runner and the gate that are removed after ejection of a molded product are shown surrounded by a dashed ellipse (see FIG. 3).

As described so far, the plurality of hollow portions 19 is formed in the resin liner 20 so as to follow the axial direction of the high-pressure tank 1. The pressurized gas may be injected during injection of the resin to enlarge the cavity. In this specification, that the term "follow the axial direction of the high-pressure tank 1" does not mean that the hollow portion 19 is entirely linearly parallel to the axial direction of the high-pressure tank 1. It means that the hollow portion 19 is formed to follow the shape of the high-pressure tank 1.

Formulation of the hollow portion 19 by injection of the pressurized gas can be conducted by using a gas injection molding method. Gas injection equipment includes a gas cylinder or a pressurized-gas generator, and a gas injector in addition to a common injection-molding machine. The mold also has a gas injection part. In a general procedure of gas injection molding, a molded product with a hollow structure can be obtained by directly injecting inert gas into a nozzle, the runner, or the cavity after melted resin is injected into the mold. The basic principle of the gas injection molding method is that, after melted resin is injected into the mold, one of the male and female molds is moved during injection of inert gas into the resin, and then the volume of the mold cavity is increased to obtain a highly-hollow molded product.

Next, the resin liner 20 that is formed with the hollow portions 19 is removed from the mold 80 after having cooled sufficiently (step SP5). Furthermore, the runner and the gate (a portion surrounded by the dashed (dotted) ellipse in FIG. 3, also indicated by the numeral 20g in FIG. 4) of the removed resin liner 20 are cut off (step SP6). A discharge port for discharging hydrogen gas and the like from the tank during use of the high-pressure tank 1 is formed by cutting off the gate 20g of the resin liner 20 (see FIG. 4). Although not particularly shown in detail, the discharge port is formed near a portion indicated by an outline arrow in FIG. 4 in the high-pressure tank 1 of this embodiment.

Then, openings of the two resin liners 20 are abutted against and welded to each other. The cap 11 is assembled (see FIG. 7), and filament winding (FW) molding is performed (see FIG. 8). After FW molding, the high-pressure tank 1 is heated and cured to obtain a finished product (step SP7 to step SP9).

In the high-pressure tank 1 formed as described above, each of the hollow portions 19 that is formed in the resin liner 20 serves as a so-called leak port that discharges leaked gas.

Figure 12:
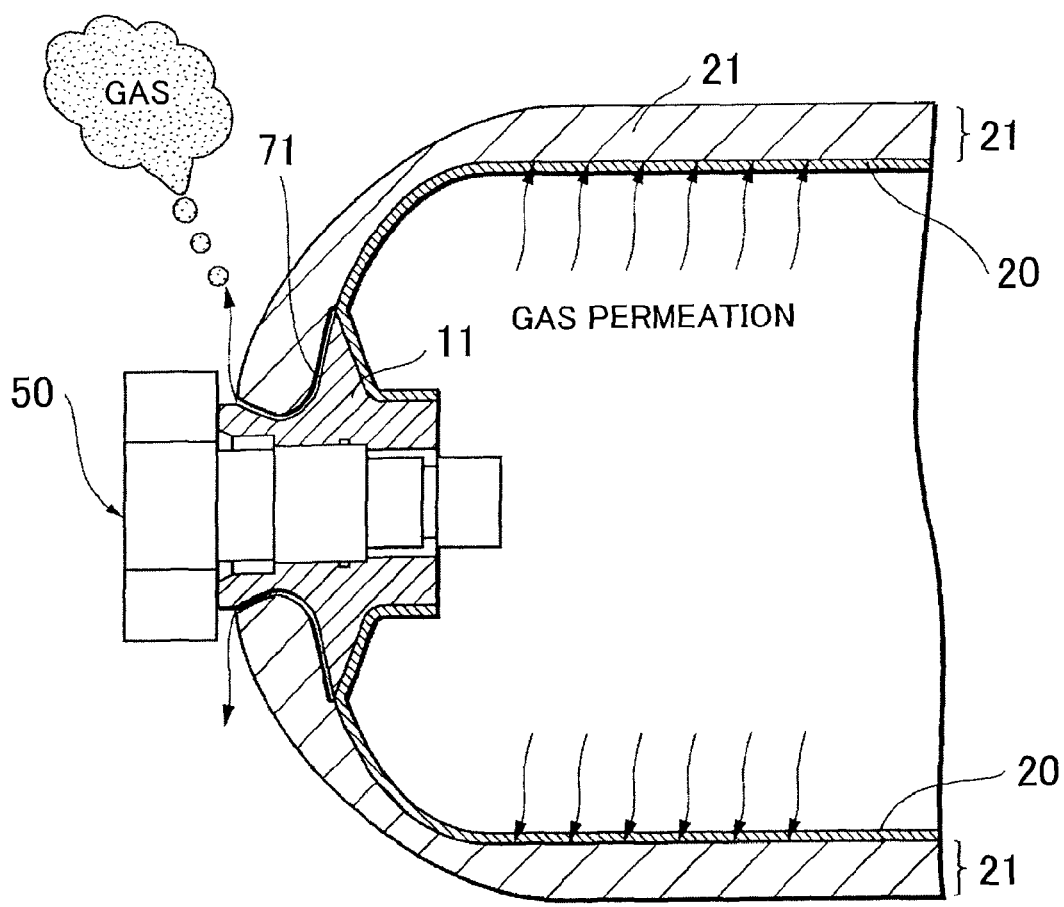
FIG. 12 shows a state where hydrogen gas that has permeated through the resin liner is accumulated between the resin liner and the outer reinforced layer (CFRP layer).

In contrast, in the case of a high-pressure tank that is constructed only from the resin liner 20 and the CFRP layer 21, hydrogen gas that has permeated through the resin liner 20 accumulates in a space between the resin liner 20 and the outer reinforced layer (the CFRP layer 21 in this embodiment), which may cause the resin liner 20 to buckle inwards during discharge of hydrogen gas (see FIG. 10A and FIG. 10B). The resin liner 20 that has been deformed during discharge of hydrogen gas as described above returns to its original shape when the cylinder is refilled with pressurized hydrogen gas. Then, when hydrogen gas is discharged again, the resin liner 20 buckles inward again. Repeated buckling of the resin liner 20 may eventually render the resin liner unusable (see FIG. 11). In the case that hydrogen gas is accumulated in the space between the resin liner 20 and the reinforced layer (CFRP layer 21) and that the inside of the high-pressure tank 1 is at high pressure, a space between the CFRP layer 21 and the cap 11 is pressurized and sealed. Thus, hydrogen gas remains accumulated. However, if the internal pressure decreases with use of hydrogen gas and the like, hydrogen gas may leak from the tank through the weakly sealed space between the CFRP layer 21 and the cap 11 (see FIG. 12).

In contrast, in the high-pressure tank 1 of this embodiment in which the hollow portion 19 formed in the resin liner 20 above functions as a so-called leak port, it is possible to prevent hydrogen gas from accumulating in the space between the resin liner 20 and the CFRP layer 21. In addition, because FW molding is performed when the hollow portion 19 is formed inside of the resin liner 20 in this embodiment, hydrogen gas that has permeated through the inner side of the liner passes through the hollow portion 19 and is discharged from the vicinity of the cap 11 to the outside when the tank is in use. Moreover, due to the hollow structure, the strength of the liner is increased, leading to the prevention of deformation such as so-called inward dent.

For example, in each embodiment described above, the size and the number of the hollow portion 19 are not described. However, the size and the number of the hollow portion 19 are not particularly limited. In addition, the size and the number of the hollow portion 19 can be adjusted appropriately by varying the number of the pressurized-gas injection port (gate 83), the cross section of the resin liner 20, pressure of the injected gas, and the like, for example.

In the above embodiment, a the high-pressure tank 1 for storing hydrogen that is used as a fuel supply source in the fuel cell system 100 has been described. However, the embodiment is merely one example of the present invention. Therefore, the high-pressure tank 1 according to the present invention may also be used to store gases other than hydrogen gas.

Figure 7:
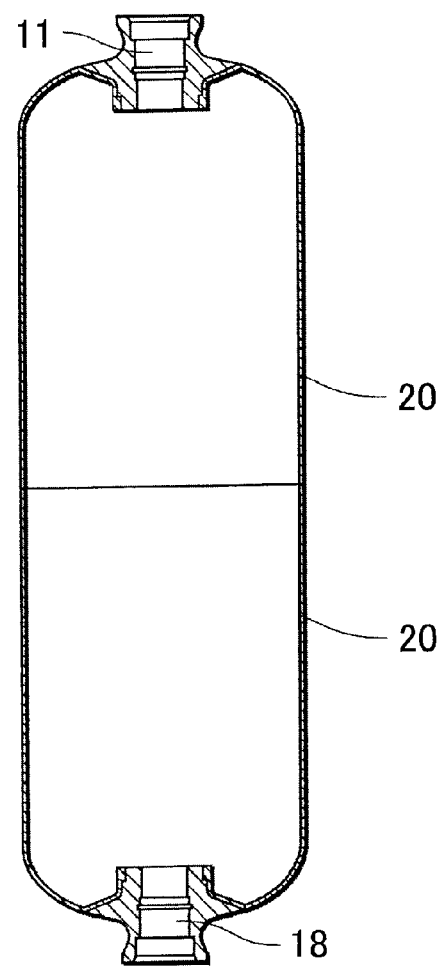
FIG. 7 shows that open ends of two resin liners are abutted against and welded to each other.
Figure 8:
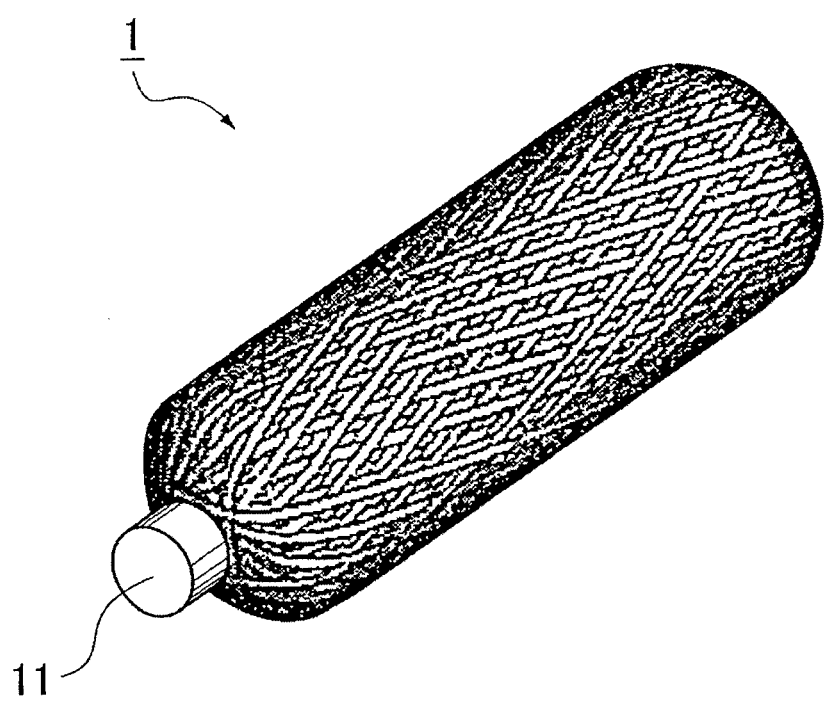
FIG. 8 is a perspective view that shows an example of the high-pressure tank after FW molding.

The description has been made so far by exemplifying the component indicated by the numeral 11 as the cap. However, the cap in the present invention is not limited to the one to which the valve assembly 50 is attached. In other words, if a boss is provided on the opposite side of the high-pressure tank 1 from the valve assembly 50, a cap to which the boss is attached may also be considered as the cap of the present invention. In FIG. 7 and FIG. 10, the cap to which the boss is attached is indicated by the reference numeral 18.

The gas tank in the above invention may further include a discharge port formed nearing the vicinity of a cap. One end of the hollow portion may be communicated with the discharge port.

A plurality of hollow portions may be provided in the above invention. The plurality of the hollow portions may be formed at equally spaced intervals in the circumferential direction of the liner.

The hollow portions in the above invention may be formed along the entire length of the liner.

In the above invention, the pressurized gas may be injected during the resin is injected.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A method of manufacturing a liner for gas tank that includes the liner and a fiber reinforced plastic layer, comprising:
    injecting resin from an injection gate into a cavity formed between an inner periphery of a main platen of a mold and an outer periphery of a core of the mold, which core is located inside the main platen;
    injecting pressurized inert gas through the gate while enlarging the cavity by pulling back a part of the core; and
    cooling down and hardening the resin while gas pressure is maintained for a specified time period, and then discharging the pressurized gas to collect the liner;
    wherein a plurality of hollow portions extend in an axial direction of the gas tank, following a shape of the tank, and are enclosed by a wall of the liner;
    wherein each of the plurality of hollow portions functions as a leak port that discharges leaked gas; and
    wherein a resin portion separates each of the plurality of hollow portions from the fiber reinforced plastic layer.

2. The method of manufacturing the liner according to claim 1, wherein the pressurized gas is injected during the time when the resin is injected.

3. The method of manufacturing the liner according to claim 1, wherein one end of the liner is an opening, and
    the method further comprising:
    cutting off a gate portion of the liner;
    welding the opening, which is an end of the liner, to an opening of an identical liner; and
    forming a cap in the other end of the liner.

* * * * *